Feb. 12, 1957 T. J. GEOGHEGAN 2,781,494

ULTRASONIC DELAY LINES

Filed March 18, 1953

INVENTOR
TERRENCE J. GEOGHEGAN

BY Joseph Weingarten
ATTORNEY

United States Patent Office 2,781,494
Patented Feb. 12, 1957

2,781,494

ULTRASONIC DELAY LINES

Terrence J. Geoghegan, Mattapan, Mass., assignor to Laboratory for Electronics, Inc., Boston, Mass., a corporation of Delaware Application March 18, 1953, Serial No. 343,203

8 Claims. (Cl. 333—30)

The present invention relates in general to ultrasonic delay lines and more particularly concerns novel solid delay lines reliably furnishing comparatively lengthy signal delays in compact structures of modest complexity and cost.

Numerous signal delay systems are now commercially available to meet the needs of the radar, computer and allied arts. Lumped constant networks are quite satisfactory for short delays, while liquid and solid ultrasonic delay lines are almost universally used for longer delays. In the latter line types, signal energy is coupled through an input transducer to a liquid or solid acoustic transmission medium, and extracted through an output transducer at a point separated from the input by a delay path of predetermined length and shape. The signal delay is equal to the time required for ultrasonic energy of the selected mode to traverse the path between input and output transducers. By precise calculation and fabrication of the line structure, this delay time is accurately controllable.

In a liquid delay line, the ultrasonic transmission medium is most often a tube of mercury, while in a solid line, the transmission path lies within a quartz plate.

The determination of whether to use liquid or solid lines in a specific application is dependent upon many factors. For example, where portability and shock resistance are required, large size and weight combined with delicate mercury seals place the liquid delay line at a marked disadvantage. On the other hand, the solid delay line is, for short delays, often more costly than the liquid type. For intermediate delay requirements of the order of 1500 microseconds, present costs are essentially the same for liquid and solid types, and, consequently, superior portability and smaller size favor the selection of the solid type.

It has been possible to construct mercury lines above this intermediate range, but massive size and weight necessarily limited their scope of application. Theoretically, at least, it is possible to construct a solid delay line of the polygonal quartz plate type furnishing any desired long delay simply by multiplying all dimensions of present shorter solid lines by a suitable scale factor. Although signal attenuation in such longer lines would not be prohibitive, the resulting thin plate of large diameter as required to perform the function is of impractical shape, and further, almost impossible to procure without beam distorting inclusions. Wholly aside from these technical considerations, the cost of large quartz blocks is sufficient to exclude the practical application of such lines.

It has been proposed to overcome the difficulties in obtaining delays of the order of 2500 or more microseconds to couple electroacoustically two delay lines having a combined delay equal to that desired. That is, to obtain a 2500 microsecond delay, the output transducer of a first 1250 microsecond delay line might be coupled to the input transducer of a second identical line through an intermediate amplifier to make up for the inherent losses of coupling. But those familiar with this art are aware that the largest contribution to signal attenuation resulting from the use of delay lines is encountered in the transducers in the interchange between electrical and ultrasonic energy. Thus, aside from the consideration of cost of an otherwise unnecessary amplifier for high frequency waveforms, this proposal is limited by excessive losses and distortion introduced through the use of additional transducers.

The present invention contemplates and has as a primary object the provision of ultrasonic delay lines capable of furnishing delays far in excess of those heretofore available, while not seriously increasing cost, size, or design complexity over conventional delay lines of much less delay.

In one specific aspect of the present invention, polygonal prismatic delay plates having design characteristics acceptable for relatively small or intermediate signal delays, are acoustically coupled to yield a delay time equal substantially to the sum of the delays of the individual plates. One of the chief advantages of the present invention is that it allows those engineering design principles already thoroughly advanced for smaller delay lines to be incorporated directly into the design of efficient and reliable units of longer delay.

Generally speaking, the present invention contemplates acoustically coupling stacked delay members by prisms of the same material used for the delay members. If a design is available capable of a delay of $t$ microseconds, a total delay of substantially $nt$ microseconds is available by stacking $n$ members coupled by $n—l$ prisms. The acoustic coupling in no way changes the delay path originally prescribed in each delay member. Thus, the delay path traveled by the applied signal from the input transducer in the first delay member is the same as it would have been if stacked members were not used, with the exception that the signal output enters a coupling prism rather than impinging upon a transducer, and is then multiply reflected into the next plate where the signal traverses the path which would have been traversed had the prism been an input transducer. Subsequent to traveling the normal delay path in the second plate, the signal may be similarly coupled to a third plate, or if sufficient delay has been achieved, may be extracted through an output transducer.

In accordance with various other aspects of the present invention, the ultrasonic coupling prism may be formed as a separate element and then bonded to the facets of the plates to be coupled, or coupling prism and delay plates may be formed by a novel method herein disclosed from a single piece of the transmission solid used so that no absorbing or reflecting surfaces are interposed in the ultrasonic wave path from input to output transducers.

It is therefore another object of the present invention to provide an ultrasonic delay line comprised of acoustically coupled solid delay members. Another object of the present invention is to provide novel means for acoustically coupling a plurality of delay members without excessive coupling losses. A further object of the invention is to provide a method for fabricating an acoustic delay line having a multiplicity of coupled delay members.

These and other objects of the present invention will now become apparent from the following detailed specification when taken in connection with the accompanying drawing in which.

Figure 2:
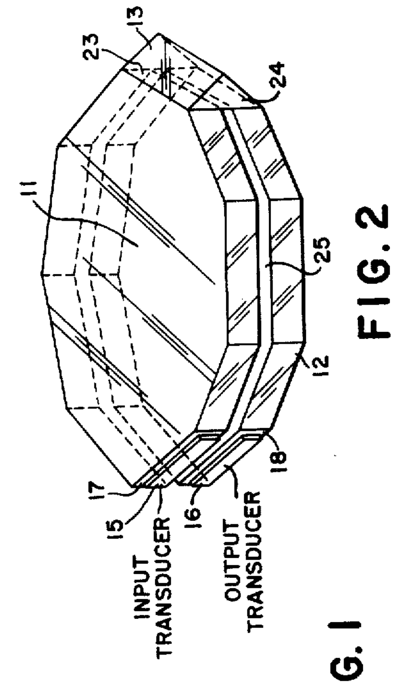
Fig. 2 is a perspective view of the delay line of Fig. 1.
Figure 1:
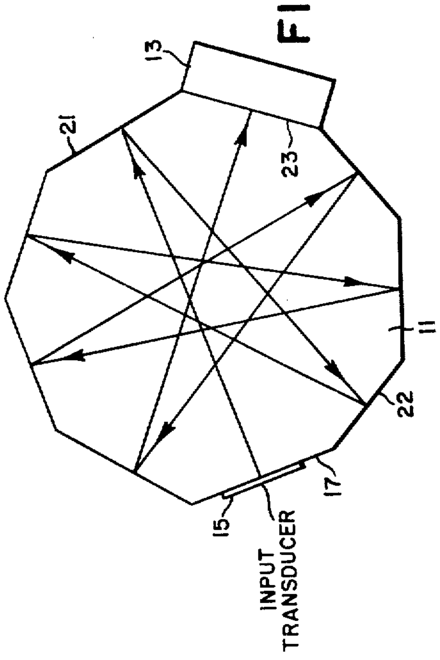
Fig. 1 is a plan view of one embodiment of the delay line of the present invention illustrating the transmission delay path available.

With reference now to the drawing and more particularly to Figs. 1 and 2, there is shown an ultrasonic delay line comprising a stacked pair of relatively thin, polygonal plates 11 and 12 acoustically joined along adjacent facets thereof by right prism 13. Inasmuch as the art of solid delay line design and construction is reasonably well understood, it will suffice to say that delay members 11 and 12 and coupling prism 13 are formed of fused quartz, or such other material as is available, combining the desired features of low attenuation for ultrasonic energy transmission with relatively low propagation velocity.

Input and output transducers 15 and 16 are appropriately affixed to adjacent facets 17 and 18, respectively, of delay members 11 and 12. These transducers are ordinarily relatively thin rectangular piezoelectric crystals and are soldered or otherwise securely bonded to the delay line facets, and are appropriately coupled to the external circuit through connecting wires (not shown). The length of a transducer is substantially equal to that of the facet upon which it is secured so that at high frequency of operation, the crystal face is many wavelengths long and thus provides the high degree of directivity needed. Actual thickness of a crystal transducer for use at a mean operating frequency of 15 megacycles per second, for example, is merely a few thousandths of an inch; hence, this thickness has been exaggerated in the drawing for clarity.

It is emphasized at this point that numerous practical approaches are known enabling the design of a delay member. In the polygonal plate type shown in Figs. 1 and 2, ultrasonic energy originating at input transducer 15 is incident upon facet 21 at a slight angular deflection from normal, and is there reflected to facet 22 for further reflection along the path marked out by arrowheads in Fig. 1. The full delay path is equal to the sum of the individual paths between reflecting facets. Right-angled prism 13 acoustically couples output facet 23 of delay member 11 to input facet 24 of delay member 12. Sonic energy thus entering delay member 12 traverses a star-shaped path of essentially the same as that illustrated in Fig. 1 and ultimately impinges upon output transducer 16 for conversion to the delayed electrical signal. Clearly, the total delay between input and output transducers 15 and 16, respectively, is twice the delay of a single delay member plus the small delay introduced in coupling prism 13.

When using quartz plates for delay members 11 and 12, it is highly desirable to transmit an ultrasonic signal as a shear wave rather than as a longitudinal wave to take advantage of the lower propagation velocity. A shear wave is reflected with an angle of reflection equal to the incidence angle, and there is no separation during reflection to yield other undesirable modes. In prism 13, both reflecting planes are mutually perpendicular and further, by virtue of the construction shown, are inclined at 45° to the direction of the beam in both plates. As shown in Fig. 1, energy emitted from transducer 15 strikes facet 23 at a normal angle of incidence. Thus, energy enters plate 12 at facet 24 at the same, normal angle. By virtue of this angular arrangement, there is total reflection within the prism without phase change.

To prevent undue mechanical strain upon prism 13, it is preferable that a supporting member or substance (not shown), such as a plastic disk, which will not interfere with the acoustic properties of plates 11 and 12, be interposed in the space 25 between the contiguous adjacent faces thereof.

Prism 13 may be formed of a separate piece of quartz, and mechanically bonded to adjacent facets 23 and 24. Whatever substance is used to attach the prism will introduce an attenuating interface. This loss, though undesirable, is not unduly restrictive if the bond is carefully made using techniques similar to those already known for affixing the crystals.

Prism 13 may, however, be formed as an integral part of the delay medium. It is true that this increases the complexity of the quartz grinding procedures necessary to complete the delay line and increases the ultimate cost of the line. But the elimination of cemented or soldered interfaces materially improves signal-to-noise ratio. Also, as compensation, it is then possible to grind both delay members 11 and 12 simultaneously to the polygonal shape necessary.

Figures 3, 4:
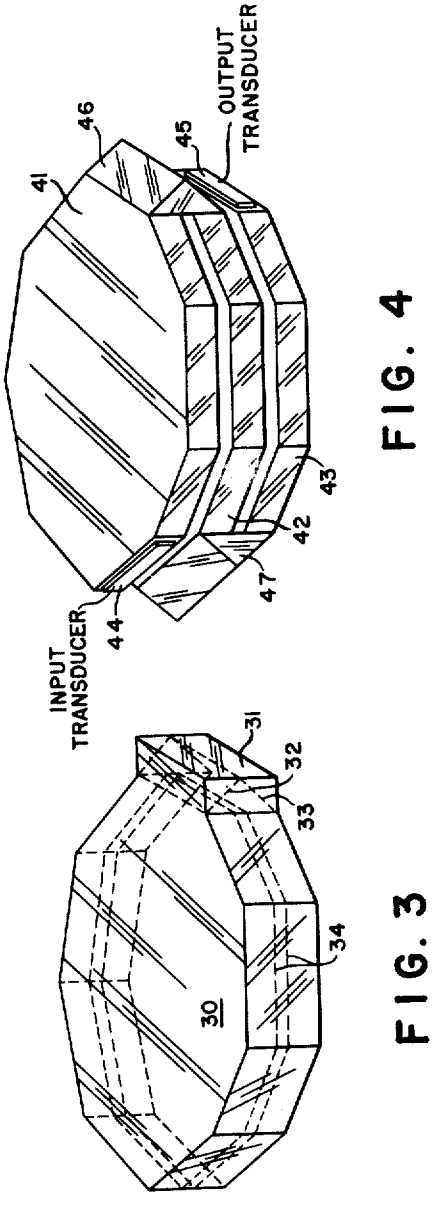
Fig. 3 is a perspective view of a block of acoustic transmission material, useful in explaining the method of fabricating the delay line of Fig. 2.
Fig. 4 is a perspective view of a delay line incorporating the concepts disclosed in Figs. 1–3 but providing a still greater transmission path.

For an explanation of these concepts, reference is now made to Fig. 3 wherein there is illustrated a right prism 30 which has been ground or otherwise shaped from a quartz block. The thickness selected is equal to the thickness of two delay members such as 11 and 12 in Fig. 2, plus the desired small separation 25. An integral rectangular extension 31 is provided, as shown in Fig. 3, as a blank from which the right coupling prism 13 may be formed. With the quartz block in the shape shown in Fig. 3, the planar surfaces indicated by broken lines 32 and 33 are then ground to form the coupling prism. Next, a cut is made through the region outlines by broken lines 34 to form separation 25 (Fig. 2) and the two attached delay members. To complete the delay line, it is only necessary to affix input and output transducers and to properly encase the unit to preclude damage due to shock.

The principles disclosed above in connection with Figs. 1, 2 and 3 are equally applicable for delays greater than that provided by stacking two delay members. Fig. 4 illustrates three delay members 41, 42 and 43 having input and output transducers 44 and 45, respectively, and acoustic coupling prisms 46 and 47 combined so that a delay path equal to three times the delay of a single plate is obtained. Prisms 46 and 47 may be individual components bonded to the line facets, or the three delay plates and the two prisms may be formed as an integral unit using an extension of the methods disclosed earlier in connection with Fig. 3.

The useful characteristics and advantages of the delay lines disclosed in the present invention are particularly evident when a practical example is considered. If a 2500 microsecond delay line were to be constructed using a single, flat quartz plate of polygonal form, a disk approximately fifteen inches in diameter and one-half inch thick would be required before grinding the facets. Neglecting difficulties in procurement of quality quartz of such size and the excessive cost thereof, its volume would be approximately 88 cubic inches. A 2500 microsecond line in the form shown in Fig. 2 may be obtained by forming two delay members one-fourth inch thick and seven and one-half inches in diameter with relatively slight intermediate spacing. The total volume thus required is approximately 22 cubic inches, or one-fourth the volume and weight of the flat plate line.

It should be emphasized at this point that acoustic coupling of solid delay members to achieve long delays is not limited herein merely to the stacked polygons shown in the drawings. Other shapes and arrangements may be used. For example, instead of the polygons shown, rectangular delay members joined by a common quartz prism may be used. In certain applications where space requirements are not severe, the delay plates may be joined end to end rather than in the stacked relation shown in the drawings.

In view of the fact, therefore, that numerous modifications and departures may now be made by those skilled in this art, the invention herein is to be construed as limited only by the appended claims.

What is claimed is:

1. An ultrasonic delay line comprising, a unitary structure formed with a plurality of sonically coupled individual delay members providing a like plurality of folded multiple internal reflection delay paths disposed in mutually spaced planes.

2. An ultrasonic delay line comprising, an integral structure formed with a plurality of individual delay members having predetermined folded ultrasonic delay paths lying in a like plurality of mutually spaced planes, whereby the total delay path of said delay line equals the sum of said folded paths.

3. An ultrasonic delay line comprising, a stacked plurality of solid polygonal, relatively thin delay plates each having an ultrasonic signal input and output and each arranged to provide a substantially planar folded multiple internal reflection delay path between input and output thereof, the planes defined by said folded paths being mutually spaced, transducers affixed respectively to the input and output of the first and last delay members of said stack, and integrally formed prisms coupling each remaining ultrasonic signal output to the ultrasonic signal input of the next successive plate in said stack.

4. An ultrasonic delay line comprising, first and second parallel spaced solid polygonal delay plates of substantially similar faceted form each having ultrasonic signal input and output facets and each arranged to provide a folded multiple internal reflection delay path between input and output facets thereof, said folded multiple reflection delay paths of said first and second plates lying in spaced parallel planes, an input transducer affixed to said input facet of said first plate, a prism having reflecting surfaces intersecting in an axis parallel to the surface planes of said plates and sonically joining the output facet of said first plate to said input facet of said second plate, and an output transducer affixed to said output facet of said second plate.

5. An ultrasonic delay line comprising, a stacked plurality of parallel spaced solid polygonal delay plates of substantially similar faceted form each having ultrasonic signal input and output facets and each arranged to provide folded multiple internal reflection delay path between input and output facets thereof, said folded multiple delay paths lying in mutually spaced parallel planes, an input transducer affixed to said input facet of the first of said stacked plates, an output transducer affixed to said output facet of the last of said stacked plates, and prisms joining each remaining output facet respectively to the input facet of the next successive plate in said stack, whereby the total delay path between said input and output transducers equals the sum of the folded multiple internal reflection delay paths between input and output facets of each of said plates and the delay paths of said prisms.

6. Apparatus as in claim 5 wherein said prisms intercoupling successive plates in said stack are integral extensions of said plates.

7. An ultrasonic delay line comprising, first and second parallel spaced relatively thin solid delay plates each formed with a plurality of peripheral reflecting facets, an input transducer affixed to said first delay plate and oriented whereby ultrasonic energy introduced thereby is multiply reflected from said peripheral facet thereof to define a first planar folded transmission path, a prism having reflecting surfaces intersecting in an axis parallel to said delay plates for sonically joining said first delay plate from a region at the end of said first transmission path to said second delay plate, and an output transducer affixed to said second delay plate, said prism being arranged whereby ultrasonic energy entering said second delay plate after traversing said first transmission path is multiply reflected by said peripheral facets of said second delay plate to define a second planar folded transmission path spaced from the plane of said first path and extending to said output transducer.

8. An ultrasonic delay line comprising, first and second relatively thin solid delay plates each formed with a plurality of peripheral reflecting facets, an input transducer affixed to said first delay plate and oriented whereby ultrasonic energy introduced thereby is multiply reflected from said peripheral facets thereof to define a first planar folded transmission path, a prism for sonically joining said first delay plate from a region at the end of said first transmission path to said second delay plate, and an output transducer affixed to said second delay plate, said prism being arranged whereby ultrasonic energy entering said second delay plate after transversing said first planar transmission path is multiply reflected by said peripheral facets of said second delay plate to define a second planar folded transmission path extending to said output transducer, said first and second delay plates being arranged in parallel and spaced one from the other in a direction substantially perpendicular to said first and second planar transmission paths.

References Cited in the file of this patent

UNITED STATES PATENTS

| | | |
|---|---|---|
| 1,678,116 | Harrison | July 24, 1928 |
| 2,309,268 | Hoske | Jan. 26, 1943 |
| 2,317,612 | Huebner | Apr. 27, 1943 |
| 2,505,364 | McSkinin | Apr. 25, 1950 |
| 2,578,452 | Roberts | Dec. 11, 1951 |
| 2,615,981 | Doelz | Oct. 28, 1952 |
| 2,649,550 | Hardie et al. | Aug. 18, 1953 |
| 2,659,053 | Johnson | Nov. 10, 1953 |
| 2,712,638 | Arenberg | July 5, 1955 |

OTHER REFERENCES

Article, "Improved Ultrasonic Delay Lines" by Netz and Anderson, pub. in "Electronics," July 1949, pages 96–100. (Copy in 333–30.)

UNITED STATES PATENT OFFICE

Certificate of Correction

Patent No. 2,781,494 February 12, 1957

Terrence J. Geoghegan

It is hereby certified that error appears in the printed specification of the above numbered patent requiring correction and that the said Letters Patent should read as corrected below.

Column 2, line 30, for "*n–l* prisms" read —*n*–1 prisms—; column 4, line 24, for "outlines" read —outlined—.

Signed and sealed this 4th day of February 1958.

[SEAL]

Attest:
KARL H. AXLINE,
*Attesting Officer.*

ROBERT C. WATSON,
*Commissioner of Patents.*